(12) United States Patent
Ishikawa et al.

(10) Patent No.: US 11,474,973 B2
(45) Date of Patent: Oct. 18, 2022

(54) USER-BASED FILE SEARCH RESULTS

(71) Applicant: International Business Machines Corporation, Armonk, NY (US)

(72) Inventors: Miki Ishikawa, Tokyo (JP); Norie Iwasaki, Fujisawa (JP); Manami Aoyama, Tokyo (JP); Mayumi Hoshino, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 101 days.

(21) Appl. No.: 17/074,790

(22) Filed: Oct. 20, 2020

(65) Prior Publication Data

US 2022/0121621 A1 Apr. 21, 2022

(51) Int. Cl.
*G06F 16/14* (2019.01)
*H04L 51/08* (2022.01)
*H04L 51/42* (2022.01)

(52) U.S. Cl.
CPC .......... *G06F 16/148* (2019.01); *G06F 16/144* (2019.01); *H04L 51/08* (2013.01); *H04L 51/42* (2022.05)

(58) Field of Classification Search
CPC ..... G06F 16/144; G06F 16/148; H04L 51/08; H04L 51/22
See application file for complete search history.

(56) References Cited

U.S. PATENT DOCUMENTS

| | | | |
|---|---|---|---|
| 8,156,152 B2 | 4/2012 | Zou | |
| 10,552,490 B2 | 2/2020 | Gross | |
| 11,343,220 B2* | 5/2022 | Anerella | G06F 16/9536 |
| 2006/0106793 A1* | 5/2006 | Liang | G06F 16/951 |
| | | | 707/999.005 |
| 2006/0218275 A1* | 9/2006 | Labio | H04L 67/1044 |
| | | | 709/224 |
| 2012/0158728 A1* | 6/2012 | Kumar | G06F 16/954 |
| | | | 707/E17.046 |
| 2013/0246334 A1* | 9/2013 | Ahuja | G06F 16/93 |
| | | | 707/600 |
| 2015/0186381 A1 | 7/2015 | Yan | |
| 2019/0065490 A1 | 2/2019 | Kumarasamy | |
| 2021/0026903 A1* | 1/2021 | Grant | G06F 16/951 |
| 2021/0224464 A1* | 7/2021 | Prakash | G06F 40/197 |
| 2021/0240705 A1* | 8/2021 | Trigonakis | G06F 16/2471 |

FOREIGN PATENT DOCUMENTS

JP 20136522420136522 A 4/2013

OTHER PUBLICATIONS

Goguen et al., "Use of File Extension Index for Faster Search", An IP.com Prior Art Database Technical Disclosure, Original Publication Date: Jul. 28, 2009, IP.com No. IPCOM000185605D, IP.com Electronic Publication Date Jul. 28, 2009, 6 pages.

* cited by examiner

*Primary Examiner* — Angelica Ruiz
(74) *Attorney, Agent, or Firm* — David B. Woycechowsky

(57) ABSTRACT

Identifying a set of message files associated with a user. The identified files are processed on a file-by-file basis according to a closeness relationship. Message files are returned responsive to a search request and displayed according to the closeness relationship.

15 Claims, 4 Drawing Sheets

USER-BASED FILE SEARCH RESULTS

BACKGROUND

The present invention relates generally to the field of electronic communication, and more particularly to managing attached files received by electronic communications.

Electronic mail (e-mail) is a method of exchanging messages between people using electronic devices. E-mail systems are based on a store-and-forward model. E-mail servers accept, forward, deliver, and/or store messages. Neither the users nor their computers are required to be online simultaneously. The users need to electronically connect, typically to a mail server or a webmail interface, to send and/or receive messages or download attached files. An e-mail attachment, which may be referred to as a message file, is a computer file sent along with an e-mail message. One or more message files can be attached to any e-mail message. Attaching files to an e-mail message is often used as a simple method to share documents and/or images. E-mail systems typically use the MIME (multipurpose internet mail extensions) standard, making e-mail attachments more utilitarian and seamless.

SUMMARY

According to an aspect of the present invention, there is a method, computer program product and/or system for file research that performs the following operations (not necessarily in the following order): (i) receives a search request from a user for a message file based on a designated user, the search request directed to a file storage system; (ii) identifies a set of message files associated with the designated user; (iii) determines with respect to each message file in the set of message files a closeness relationship to the designated user; (iv) ranks message files in the set of message files according to the closeness relationship; and (v) presents to the requesting user a set of top-ranked message files of the set of message files.

DETAILED DESCRIPTION

Figure 1:
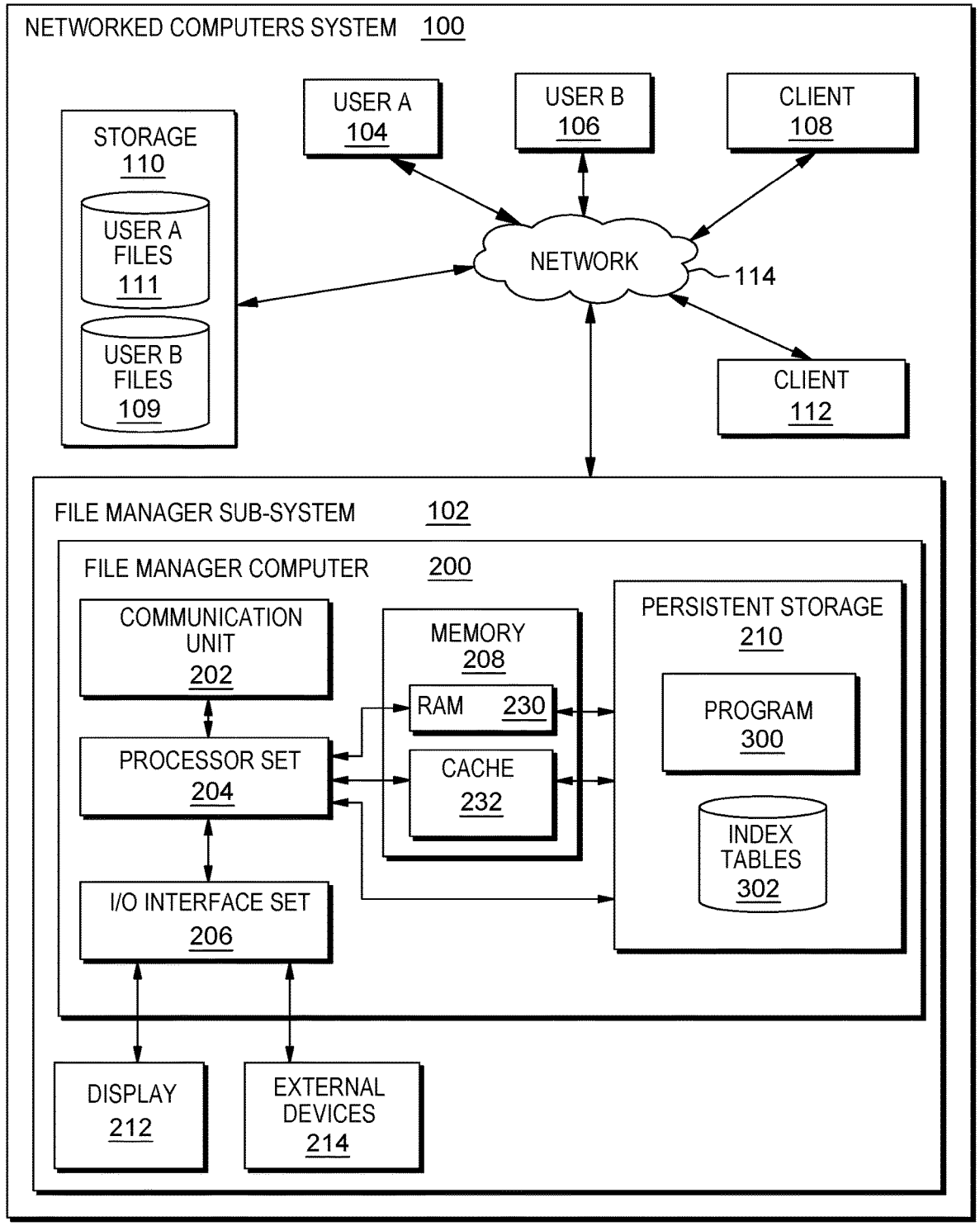
FIG. 1 is a block diagram view of a first embodiment system according to the present invention.

Some embodiments of the present invention are directed to identifying a set of message files associated with a user. The identified files are processed on a file-by-file basis according to a closeness relationship. Message files are returned responsive to a search request and displayed according to the closeness relationship.

This Detailed Description section is divided into the following subsections: (i) The Hardware and Software Environment; (ii) Example Embodiments; and (iii) Definitions.

I. THE HARDWARE AND SOFTWARE ENVIRONMENT

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: file manager subsystem 102 (sometimes herein referred to, more simply, as subsystem 102); user A 104; user B 106; client subsystems 108 and 112; user B files 109; storage 110; user A files 111; and communication network 114. Subsystem 102 includes: file manager computer 200; communication unit 202; processor set 204; input/output (I/O) interface set 206; memory 208; persistent storage 210; display 212; external device(s) 214; random access memory (RAM) 230; cache 232; file manager program 300 (sometimes herein referred to, more simply, as program 300); and index tables 302.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage, and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with file manager computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. EXAMPLE EMBODIMENTS

Some embodiments of the present invention recognize the following facts, potential problems and/or potential areas for improvement with respect to the current state of the art: (i) after transmitting and/or receiving messages with files attached via: (a) an e-mail application, (b) a business communication platform, or (c) online storage, it can be difficult to find a file with current search systems. Conventional searches are based on the file name, date of receipt, date of transmission, file type, and subject line or keyword; and (ii) it can be difficult to find the desired file because many files or folders having a similar name, may be present.

Figure 2:
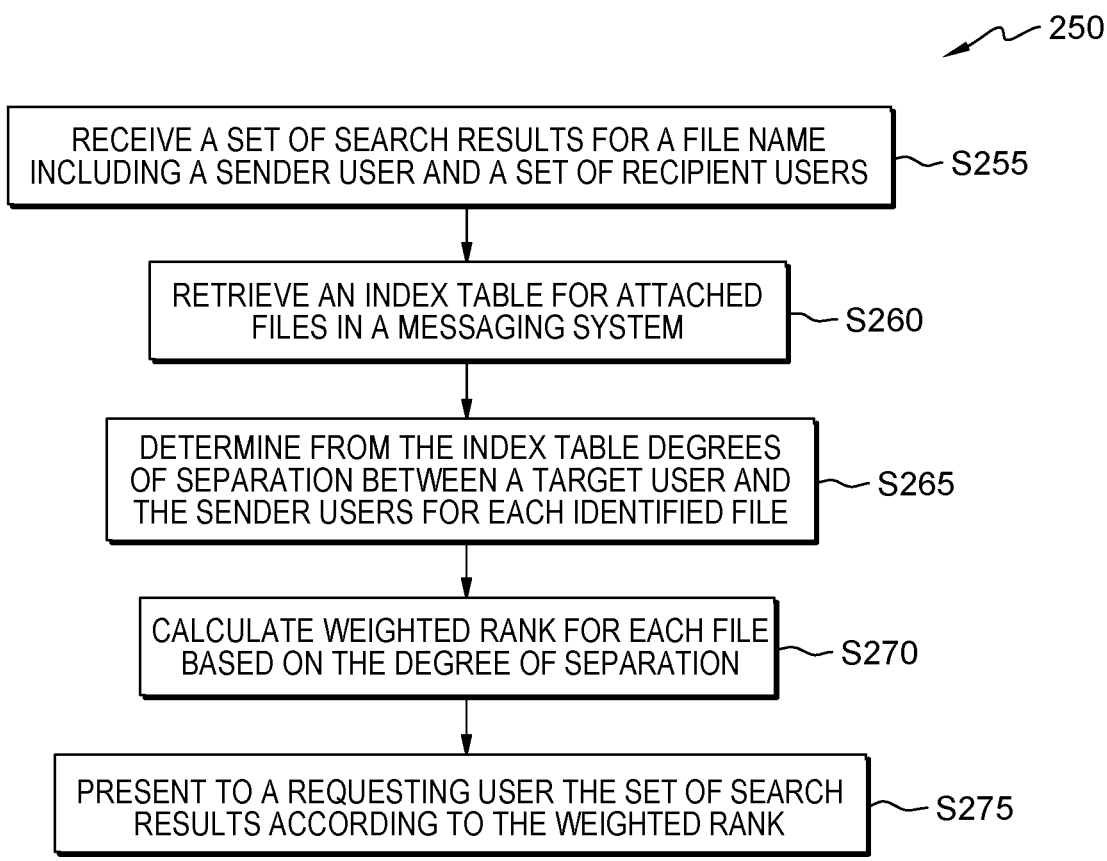
FIG. 2 is a flowchart showing a first embodiment method performed, at least in part, by the first embodiment system.
Figure 3:
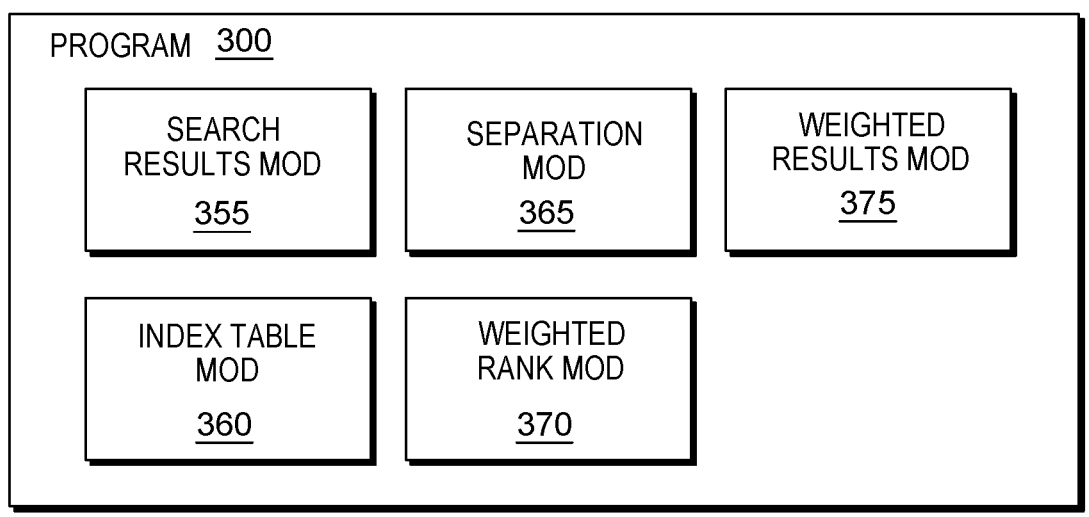
FIG. 3 is a schematic view of a machine logic (for example, software) portion of the first embodiment system.

As shown in FIG. 1, networked computers system 100 is an environment in which an example method according to the present invention can be performed. As shown in FIG. 2, flowchart 250, an algorithm that uses an index table, such as index tables store 302, to build a files storage record and to perform a data search according to some embodiments of the present invention. As shown in FIG. 3, file manager program 300 performs or controls performance of at least some of the method operations of flowchart 250 in FIG. 2. This method and associated software will now be discussed, over the course of the following paragraphs, with extensive reference to the blocks of FIG. 1 (system of an embodiment of a hardware and software environment), FIG. 2 (operational flowchart), and FIG. 3 (diagram of operation blocks).

Processing begins at operation S255, where search results module ("mod") 355 receives a set of search results for a file name including a sender user and a set of recipient users. In this example, user A sub-system 104 stores email messages and related attachments in user A files store 111 of storage sub-system 110 (FIG. 1). User B sub-system 106 stores email messages and related attachments in user B files store 109. When a search of the email records is performed, a user searches a corresponding files store containing email messages and attachments belonging that that user, whether sent by that user or received from another user. The search results received by the search results mod may include: (i) messages; (ii) attached files; and (iii) message storage location. Some embodiments of the present invention do not include message storage location because the file manager application is dedicated to a single user and a pre-defined set of message storage locations. Alternatively, messages are not included in the search results, but only attached files and the file storage location. Further, for a system dedicated to a particular user or particular entity, the file storage location may be pre-defined. The search results received at step S255 are compiled in manner known in the art such as by chronological order of the email send date. Other search results may appear in order of sender name or recipient name.

It should be noted here, as discussed in more detail below, each time a user sends or receives an email with an attachment, an index table is updates to track certain information about the attachment including: (i) sender; (ii) recipient(s); (iii) file name; and/or (iv) a time stamp. In this example, receipt of an email with an attachment by the user a sub-system prompts automatic storage of the email and corresponding attachment in the user A files storage and a corresponding index table is updated in index tables store 302 (FIG. 1).

Processing proceeds to operation S260, where index table mod 360 retrieves an index table for attached files in a messaging system. The search results received in step S255 are a search of message records and files of the same messaging system for which the index table was generated. For example, the index table mod will retrieve an index table for the user A files storage if the received search results are based on a search of a messaging application used by the user a sub-system.

Processing proceeds to operation S265, where separation mod 365 determines from the index table degrees of separation between a target user and the sender users for each identified file. When the target user received an identified file directly from a sender, the degree of separation from the sender may have a value of two. If the target user sends the identified file, the degree of separation would be 1 if receiving the file from the sender results in a value of two degrees. While the value associated with the target user and the sending user may vary, the value will increase for each user in between the path of the sending user and the target user.

In some embodiments of the present invention, separation mod 365 identifies a set of message files associated with the designated user within the search results. The system determines the degrees of separation, also referred to herein as the distance, number of steps, and number of hops, between the designated user and each associated file. According to some embodiments of the present invention, distances between message files and relevant users are recorded in the form of a graph such that tracing the graph from the designated user to the message file allows a user to "measure" the distance or visualize the degrees of separation.

Processing proceeds to operation S270, where weighted rank mod 370 calculates the weighted rank for each file based on the degree of separation from the target user. The weighted rank mod determines, with respect to each message file in the search results, a closeness relationship to the designated user. In this example, a weighting value is calculated for each file using the degree of separation from the designated user to the sender of the file. In this example, the weighting value is the inverse of the degrees of separation. In cases where the received search results are ranked by a relevance value, the degree of separation weighting value is multiplied by the relevance ranking value to obtain a new overall weighted value.

According to some embodiments of the present invention, weighted rank mod 370 ranks message files in the set of message files according to relative closeness with respect to a closeness relationship value. In this example, a file having a stronger relation to a designated user is ranked at a relatively higher rank than others. The highest-ranking file is the most likely file the user has searched for.

Processing concludes at operation S275, where weighted results mod 375 presents to the requesting user the set of search results organized according to the final weighted rank. In this example, when a search is performed by user A sub-system 104 for a file in user A files store 111, the search results are organized chronologically by send date. The search results are evaluated in view of an index table to produce a weighting value for each file in the search results. The final weighted and ranked search results are returned to the requesting user for review. Alternatively, the highest-ranking file according to the final weighted rank is opened in an application for review by the requesting user.

Figure 4:
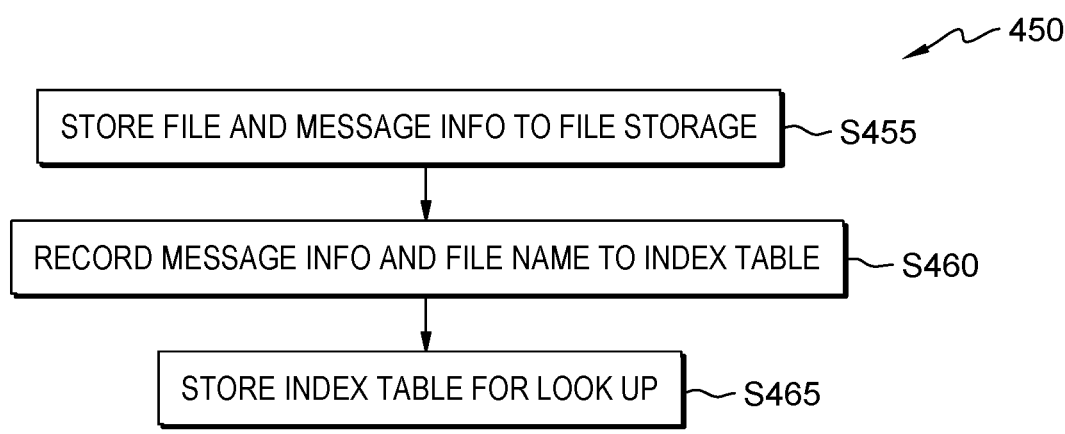
FIG. 4 is flowchart view showing a second embodiment of a system according to the present invention.
Figure 5:
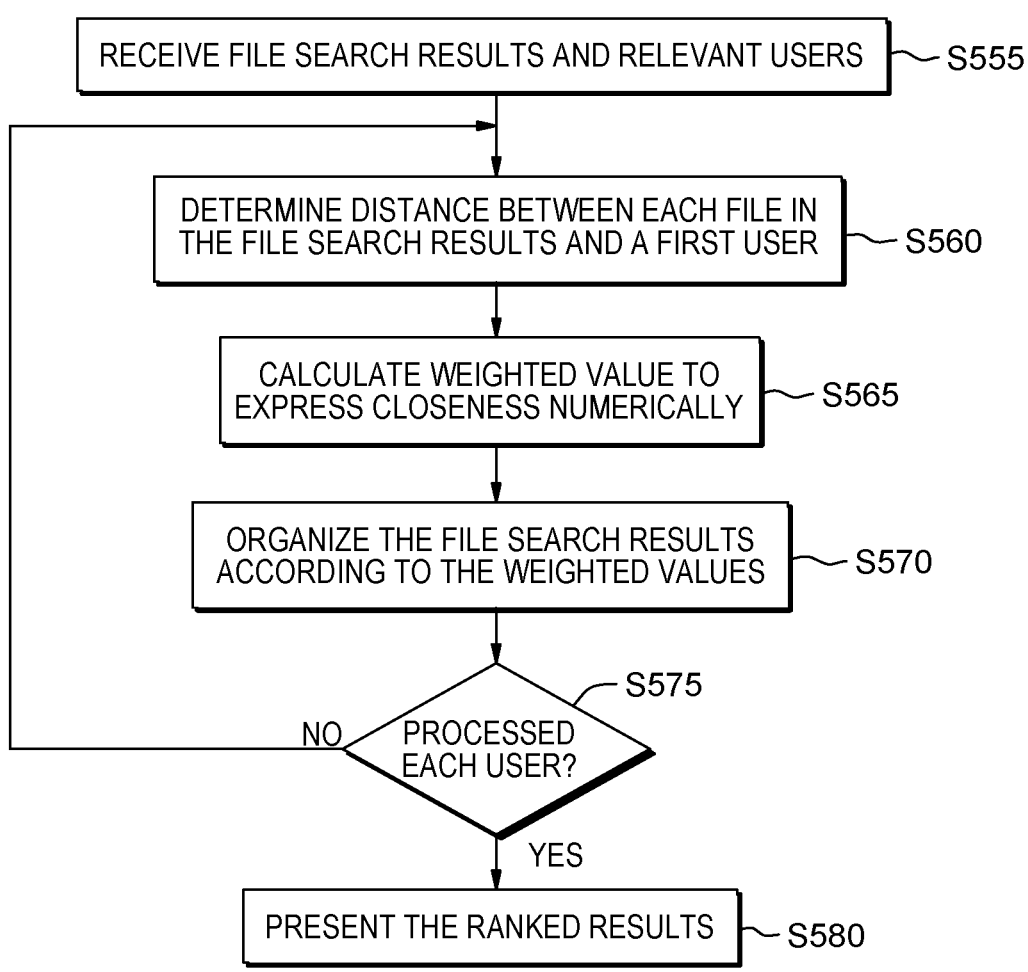
FIG. 5 is flowchart view showing a third embodiment of a system according to the present invention.
Figure 6:
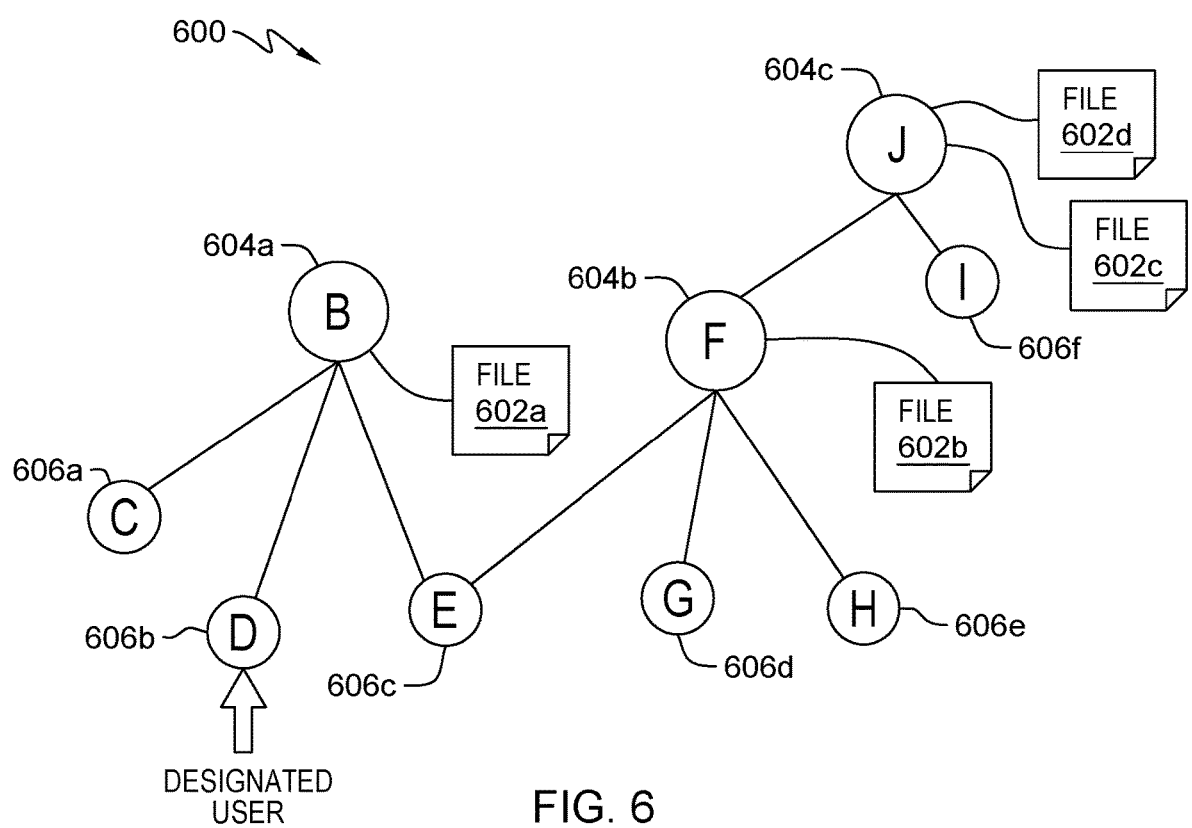
FIG. 6 is a graph view showing information that is generated by and/or helpful in understanding embodiments of the present invention.

Further embodiments of the present invention are discussed in the paragraphs that follow and with reference to FIGS. 4-6.

FIG. 4 shows flowchart 450 depicting a second method according to an embodiment of the present invention. This method and associated software will now be discussed, over the course of the following paragraphs, with extensive reference to FIG. 4 (for the method step blocks). The method outlined in flowchart 450 may be implemented in various computer systems whether a stand-along computer device or over a network system such as networked computers system 100 (FIG. 1).

Flowchart 450 illustrates a process for generating an index table for use by a search algorithm. Table 1 is an example of an index table according to some embodiments of the present invention.

Processing begins at operation S455 where the system stores file and message information to a file storage location. The file and message information to the files may include: (i) message destinations; (ii) file names; (iii) storage destinations; and/or (iv) timestamps. A timestamp often indicates date of origin, date of receipt, and/or date of transmission. Date information stored as a timestamp may include month, day, year, hour, day of the week, and/or week of the month. The input process begins the creation of a new record that is stored in a dynamic index table such as Table 1.

Processing continues to operation S460 where the system records message info and file name(s) to the index table. Identification of the name of the designated user and the names of the users that have been specified as message transmission destinations is performed on an e-mail, a business communication platform channel member, and/or online storage member. The identified information is recorded in the index table. For example, in Table 1 the information is shown in the "Sender User" and "Relevant Users" columns.

Processing concludes at operation S465 where determination of the name and place of the received file is completed. This information is stored in the index table. For example, the information is shown in the "File Place" and "File Name" columns in Table 1. Continuing with operation S460, the timestamp of reception is recorded. The recorded timestamp is stored in the index table. For example, in Table 1, the data and time is recorded in the "Timestamp" column.

Processing concludes at operation S476 where the system stores the index table for future look up operations. The information collected and/or recorded is stored as a single record in the index table. Flowchart 450 creates an index table, such as Table 1 below, and: (i) is created at the time of transmission/reception; (ii) may be updated regularly; (iii) may be a single index table; and/or (iv) may be divided into index tables separated for transmission and reception.

As shown in Table 1; (i) old data may be deleted, as appropriate, according to a restriction regarding the number of index items and/or the timestamp; and (ii) files with the same name but different content (generation management) can be managed by renaming the files internally as appropriate.

TABLE 1

Index Table Containing Input Data

| Sender User | Relevant Users | File Place | File Name | Timestamp |
|---|---|---|---|---|
| B | C, D, E | /work/projX/ | file_aaa.ppt | 2019/10/14 14:29 |
| F | C, G | /work/cosmo/ | file_bbb.xls | 2019/10/14 16:10 |
| H | K, L, M | /work/tecj/ | file_ccc.ppt | 2019/10/14 09:05 |

FIG. 5 shows flowchart 550 depicting a third method according to an embodiment of the present invention. This method and associated software will now be discussed, over the course of the following paragraphs, with extensive reference to FIG. 5 (for the method step blocks). Program 500 may be implemented on any operating system, for example: the operating system active on a partition, on the hardware management console, on a network switch, or on a storage controller. The method outlined in flowchart 550 may be implemented in various computer systems whether a stand-along computer device or over a network system such as networked computers system 100 (FIG. 1). In this example, Table 1 is used to search for a file according to the algorithm expressed in flowchart 550.

Processing begins at step S555, where the system receives file search results and relevant user information.

Processing proceeds to step S560, where the system determines a distance between each file in the file search results and a first user. The term distance has a similar meaning as degree of separation and is used in a similar way herein. In this example, the distance and subsequent calculation and ranking is performed for each identified user. In that way, this step indicates a first user while subsequent users should be considered as "a next user."

Processing proceeds to step S565, where the system calculates weighted values to express closeness numerically. The closeness of each user of a file is calculated with a weighting scheme that increases a distance value for each step away the user is from the sender of the file. According to some embodiments of the present invention, the weighted value is the inverse of the distance. Further, some embodiments of the present invention multiply the ranking value used to rank the original search results by the calculated weighted value of step S560 to determine a final weighted value.

Processing proceeds to step S570, where the system organizes the file search results according to the weighted values. Some embodiments of the present invention generate a graphical display illustrating the weighted values as physical distances from user to user.

Processing proceeds to decision step S575, where the system determines whether or not each user has been processed. If each user is processed, processing follows the "Yes" branch to step S580. If each user has not been processed, processing follows the "No" branch, returning to step S560 to select a next user.

Processing ends at step S580, where the system presents the ranked results to the requesting user.

Table 2 below shows, as an example, the results of a conventional file search. In this example, file_a has a conventional rank of 1 with a weight of 0.99. Likewise, file_d has a conventional rank of 2 with a weight of 0.98 and file_b has a conventional rank of 3 with a weight of 0.86.

TABLE 2

Initial Search Results

| Rank | File | Weight |
| --- | --- | --- |
| 1 | file_a | 0.99 |
| 2 | file_d | 0.98 |
| 3 | file_b | 0.86 |

Table 3 below shows the weighted calculation and multiplication. In this example, a weighted value for each file is calculated using the distance from the designated user to the location of the file. The weighting is the inverse of the number of steps/hops from the designated user to the file being searched for. The calculated weighting is then multiplied by the conventional weight shown in Table 2 to obtain the new weighted value.

TABLE 3

Weighting Process file_a: 1/9 × 0.99 = 0.11
file_d: 1/3 × 0.98 = 0.33
file_b: 1/5 × 0.85 = 0.17

Table 4 below shows the re-calculation of ranking according to an embodiment of the present invention. A file having a stronger relation to the specified users X is ranked at a higher rank. In this example, file_d is now the most highly ranked, with a ranking of 0.33, and is the most likely location of a designated user trying to find the file being searched for.

TABLE 4

Relationship-Weighted
Ranking of Initial Search Results

| 1 | file_d | 0.33 |
| --- | --- | --- |
| 2 | file_b | 0.17 |
| 3 | file_a | 0.11 |

According to an embodiment of the present invention a graph (herein, also known as a diagram) is created from an index table, as either a transmission or reception. A set of users relevant to a sender from the reception index table of user A is obtained. Attach information (name, storage place, timestamp) to sender and create an edge between sender and each of the relevant users to which the file is addressed such that the edge represents communications links among users. Perform a merge into the index diagram of user A. If the sender is already present on the graph, the attachment information is added, if the edges are already present, ignore the input. Repeat the above operations each time a file is received and saved. If the diagram has grown too big over time, the old edges and nodes can be deleted to allow for new edges and nodes.

FIG. 6 is a graphical representation of users and degree of separation to various files attached to messages. Senders 604a, 604b, and 604c are recorded as sending messages with attached files 602a, 602b, 602c, and 602d. Message recipients include sender 604b and recipients 606a, 606b, 606c, 606d, 606e, and 606f.

According to an embodiment of the present invention (from the perspective of user A) and as shown in FIG. 6, diagram 600; (i) user 606b and the file name is specified at the same time when performing a search; (ii) perform a conventional search with a file name to get a set of files 602a, 602b, 602c, and 602d as the search result; (iii) trace the diagram from user 606b and weight the files of the search result in ascending order of distance (example of weighting: 1/(number of steps from user 606b to the file)); (iv) multiply each of the values of the original ranking of search result by the weighed value to reflect the strength of the relation with user 606b; (v) when user 606b is not included in the relevant users in the event of receiving the file, which is to be searched for, the possibility of finding the file becomes high because files are searched for in the order of shortest distance; (vi) in addition to the conventional file name search, specifying a user who is considered as being relevant to the desired file allows efficient finding of the desired file; and (vii) utilizes information about users, relevant to an attachment file as an index, makes it possible to perform a search which takes content into account, as compared to conventional searches that are mainly based on the file name.

Some embodiments of the present invention may include one, or more, of the following operations, features, characteristics and/or advantages: (i) create an index table containing but not limited to: (a) relevant member (mail (e-mail)) address information, (b) business communication platform information, and/or (c) group information from members of a cloud content management and file sharing service when attaching, sending or receiving a file; (ii) makes the information available as metadata (attribute value) in a file system; (iii) uses the index (attribute value) to recognize and quantify the strength of the relationship between files and members as a distance; and (iv) it is desirable to search for a file efficiently by searching information relevant to the content (for example, a project of a specific member, and a specific event.) of the file.

Some embodiments of the present invention may include one, or more, of the following operations, features, characteristics and/or advantages: (i) an index containing the relationship between e-mails and user information is created; (ii) can be incorporated into a business communication platform, online storage, and/or e-mail, and the like, to enable more flexible search than conventional searches; (iii) the index is not saved in a local site but rather created using information stored in: (a) online storage, (b) a business communication platform channel, (c) information in a state of being attached to an e-mail, and/or (d) saved on a cloud environment; and (iv) makes it possible to search for not only files stored in a local site but also files that can be referenced on a web site, in a transverse manner.

A computer implemented method for file search according to an embodiment of the present invention includes the following operations (not necessarily in the following order): (i) retrieves file names, file locations and file relevant users; (ii) receives file search requests with file name and designated user; (iii) searches and ranks files by the file name; (iv) acquires distance between each file and the designated user; (v) calculates weighed values using distance; (vi) re-ranks the files based on the weighed values; (vii) stores the file names and the file relevant users in the form of diagram; (viii) acquires the distance between each file and the designated user by tracing the diagram from the designated user to each file; (ix) leverages distance between each file and the designated user; and (x) calculates weighed values using the distance.

III. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
receiving a search request from a user for a message file based on a designated user, the search request directed to a file storage system;
identifying a set of message files associated with the designated user;
determining with respect to each message file in the set of message files a closeness relationship to the designated user;
ranking message files in the set of message files according to the closeness relationship; and
presenting to the requesting user a set of top-ranked message files of the set of message files;
wherein the determination of the closeness of each given message file in the set of message files includes determining a number of hops, between the designated user and the given message file; and
wherein the determination of the number of hops for a given message file includes counting the number of graph edges traversed to get from the designated user to the given message file when traversing a graph structure.

2. The computer-implemented method of claim 1, further comprising:
storing to the file storage system message files received as attachments to electronic messages;
recording file names of message files and corresponding relevant users to an index table; and
presenting the message files and recorded information in the form of a graph.

3. The computer-implemented method of claim 1, wherein the message file is an attachment associated with an e-mail message.

4. The computer-implemented method of claim 1, wherein:
the search request is further based on a specified file name; and
the set of message files includes files that are also associated with the specified file name.

5. The computer-implemented method of claim 1 further comprising:
creating an index table entry containing search-relevant information when attaching or receiving a new file; and
making the index table entry available as metadata in the file storage system.

6. A computer program product comprising:
a set of storage device(s); and
computer code stored collectively in the set of storage device(s), with the computer code including data and instructions to cause a processor(s) set to perform at least the following operations:
  receiving a search request from a user for a message file based on a designated user, the search request directed to a file storage system;
  identifying a set of message files associated with the designated user;
  determining with respect to each message file in the set of message files a closeness relationship to the designated user;
  ranking message files in the set of message files according to the closeness relationship; and
  presenting to the requesting user a set of top-ranked message files of the set of message files;
wherein the determination of the closeness of each given message file in the set of message files includes determining a number of hops, between the designated user and the given message file; and
wherein the determination of the number of hops for a given message file includes counting the number of graph edges traversed to get from the designated user to the given message file when traversing a graph structure.

7. The computer program product of claim 6, wherein the computer code further includes instructions to cause the processor(s) set to perform the following operation(s):
  storing to the file storage system message files received as attachments to electronic messages;
  recording file names of message files and corresponding relevant users to an index table; and
  presenting the message files and recorded information in the form of a graph.

8. The computer program product of claim 6, wherein the message file is an attachment associated with an e-mail message.

9. The computer program product of claim 6, wherein:
  the search request is further based on a specified file name; and
  the set of message files includes files that are also associated with the specified file name.

10. The computer program product of claim 6 wherein the computer code further includes instructions to cause the processor(s) set to perform the following operation(s):
  creating an index table entry containing search-relevant information when attaching or receiving a new file; and
  making the index table entry available as metadata in a file storage system.

11. A computer system comprising:
a processor(s) set;
a set of storage device(s); and
computer code stored collectively in the set of storage device(s), with the computer code including data and instructions to cause the processor(s) set to perform at least the following operations:
  receiving a search request from a user for a message file based on a designated user, the search request directed to a file storage system;
  identifying a set of message files associated with the designated user;
  determining with respect to each message file in the set of message files a closeness relationship to the designated user;
  ranking message files in the set of message files according to the closeness relationship; and
  presenting to the requesting user a set of top-ranked message files of the set of message files;
wherein the determination of the closeness of each given message file in the set of message files includes determining a number of hops, between the designated user and the given message file; and
wherein the determination of the number of hops for a given message file includes counting the number of graph edges traversed to get from the designated user to the given message file when traversing a graph structure.

12. The computer system of claim 11, wherein the computer code further includes instructions to cause the processor(s) set to perform the following operation(s):
  storing to the file storage system message files received as attachments to electronic messages;
  recording file names of message files and corresponding relevant users to an index table; and
  presenting the message files and recorded information in the form of a graph.

13. The computer system of claim 11, wherein the message file is an attachment associated with an e-mail message.

14. The computer system of claim 11, wherein:
  the search request is further based on a specified file name; and
  the set of message files includes files that are also associated with the specified file name.

15. The computer system of claim 11 wherein the computer code further includes instructions to cause the processor(s) set to perform the following operation(s):
  creating an index table entry containing search-relevant information when attaching or receiving a new file; and
  making the index table entry available as metadata in a file storage system.

* * * * *